United States Patent
Nagase

(10) Patent No.: US 8,330,399 B2
(45) Date of Patent: Dec. 11, 2012

(54) ELECTRIC POWER STEERING APPARATUS

(75) Inventor: Shigeki Nagase, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 316 days.

(21) Appl. No.: 12/681,972

(22) PCT Filed: Nov. 4, 2008

(86) PCT No.: PCT/JP2008/070041
§ 371 (c)(1), (2), (4) Date: Apr. 7, 2010

(87) PCT Pub. No.: WO2009/063772
PCT Pub. Date: May 22, 2009

(65) Prior Publication Data
US 2010/0207558 A1    Aug. 19, 2010

(30) Foreign Application Priority Data
Nov. 16, 2007 (JP) ................. 2007-297765

(51) Int. Cl.
*H02P 1/00* (2006.01)
(52) U.S. Cl. ............... 318/139; 318/400.15; 318/400.3
(58) Field of Classification Search ............... 318/139, 318/400.15, 400.3, 440, 376; 701/41; 180/443
See application file for complete search history.

(56) References Cited

U.S. PATENT DOCUMENTS
2011/0035107 A1 * 2/2011 Izutani et al. .............. 701/41

FOREIGN PATENT DOCUMENTS
| JP | 5 91787 | 4/1993 |
|---|---|---|
| JP | 2003 259509 | 9/2003 |
| JP | 2003-320942 | 11/2003 |
| JP | 2005 287222 | 10/2005 |
| JP | 2007-223510 | 9/2007 |
| JP | 2007 283953 | 11/2007 |

OTHER PUBLICATIONS

Extended European Search Report issued on Sep. 22, 2011 in the corresponding European Application No. 08849712.8.
U.S. Appl. No. 12/738,954, filed Apr. 20, 2010, Nagase.
U.S. Appl. No. 12/747,024, filed Jun. 9, 2010, Nagase.
U.S. Appl. No. 12/747,079, filed Jun. 9, 2010, Nagase.

* cited by examiner

*Primary Examiner* — Karen Masih
(74) *Attorney, Agent, or Firm* — Oblon, Spivak, McClelland, Maier & Neustadt, L.L.P.

(57) ABSTRACT

A voltage detector 17 for detecting a voltage $V_B$ of a battery 9 as a main power supply and a voltage detector 18 for detecting a voltage $V_C$ of an auxiliary power supply 14 are provided. On the basis of an upper limit value $I_B$ previously defined as the maximum value of current through the battery 9, a control circuit 6 defines an upper limit of the electric power supplied to the motor 4 as $\eta \cdot V_B \cdot I_B$ ($\eta$ representing the efficiency of the driving circuit 5) when a first output mode is selected in which the auxiliary power supply 14 is not used or defines the upper limit of the electric power supplied to the motor 4 as $\eta \cdot (V_B + V_C) \cdot I_B$ when a second output mode is selected in which the auxiliary power supply 14 is used as connected in series with the battery 9.

1 Claim, 3 Drawing Sheets

ELECTRIC POWER STEERING APPARATUS

TECHNICAL FIELD

The present invention relates to an electric power steering apparatus that generates a steering assist force by a motor. More particularly, the invention relates to a configuration of electric circuit of the electric power steering apparatus.

BACKGROUND ART

The electric power steering apparatus is a machine which operates the motor for generating the steering assist force according to a steering torque applied by a driver. The recent years have seen a fast-growing demand for electric power steering apparatuses for use in large cars. Such a large car requires an increased steering assist force so that a larger amount of electric power must be supplied to the motor. In some cases, however, a battery alone may be unable to fully meet such a large power demand. In this connection, an arrangement has been proposed wherein an auxiliary power supply is provided in addition to the battery such that the normal power demand is met by the battery alone but when a larger amount of electric power is required, the electric power is supplied by both the battery and the auxiliary power supply connected in series (see, for example, Japanese Unexamined Patent Publication No. 2005-287222 (FIG. 1)).

When the voltage of the auxiliary power supply is lowered in the mode wherein the electric power is supplied by the battery and auxiliary power supply connected in series, the hitherto known electric power steering apparatus, as described above, provides control to maintain a predetermined electric power by increasing the current. Accordingly, an excess current may be extracted from the battery, which may be shortened in service life. In some cases, fuse for circuit protection may also blow.

DISCLOSURE OF THE INVENTION

In view of the problems in the art, an aspect of the present invention relates to the electric power steering apparatus that employs the auxiliary power supply and obviates the event that the excess current is extracted from the battery as a main power supply.

In accordance with the present invention, an electric power steering apparatus that generates a steering assist force by a motor, comprises: (a) a driving circuit for driving the motor and having an efficiency η, (b) a battery as a main power supply for supplying an electric power to the motor, (c) an auxiliary power supply capable of supplying an electric power to the motor, (d) a voltage detector for detecting a voltage $V_B$ of the main power supply, (e) a voltage detector for detecting a voltage $V_C$ of the auxiliary power supply, (f) a charge-discharge circuit that charges the auxiliary power supply by using the main power supply and that selectively configures a first output mode in which an electric power is supplied to the motor based on the voltage $V_B$ of the main power supply or a second output mode in which an electric power from the main power supply and the auxiliary power supply connected in series is supplied to the motor based on a voltage $V_B+V_C$, and (g) a control circuit that supplies the electric power to the motor and selects the output mode of the charge-discharge circuit according to an electric power required for steering assist and that, on the basis of an upper limit value $I_B$ previously defined as the maximum value of current through the main power supply, defines an upper limit of the electric power supplied to the motor as $\eta \cdot V_B \cdot I_B$ when the first output mode is selected or as $\eta \cdot (V_B+V_C) \cdot I_B$ when the second output mode is selected.

In the electric power steering apparatus of the above arrangement, an upper limit (variable) of the electric power according to the output mode is defined based on the upper limit value $I_B$ (fixed) previously defined as the maximum value of the current through the main power supply and the present voltage $V_B$ (variable) of the main power supply and the present voltage $V_C$ (variable) of the auxiliary power supply. If the voltage $V_B$ of the main power supply and the voltage $V_C$ of the auxiliary power supply are varied, the upper limit of the electric power is varied accordingly. Therefore, the maximum value of the current through the main power supply is always limited to the upper limit value $I_B$ or lower. Thus the excess current is prevented from being extracted from the battery as the main power supply.

BEST MODES FOR CARRYING OUT THE INVENTION

An electric power steering apparatus according to one embodiment of the present invention will be described hereinbelow with reference to the accompanying drawings.

Figure 1:
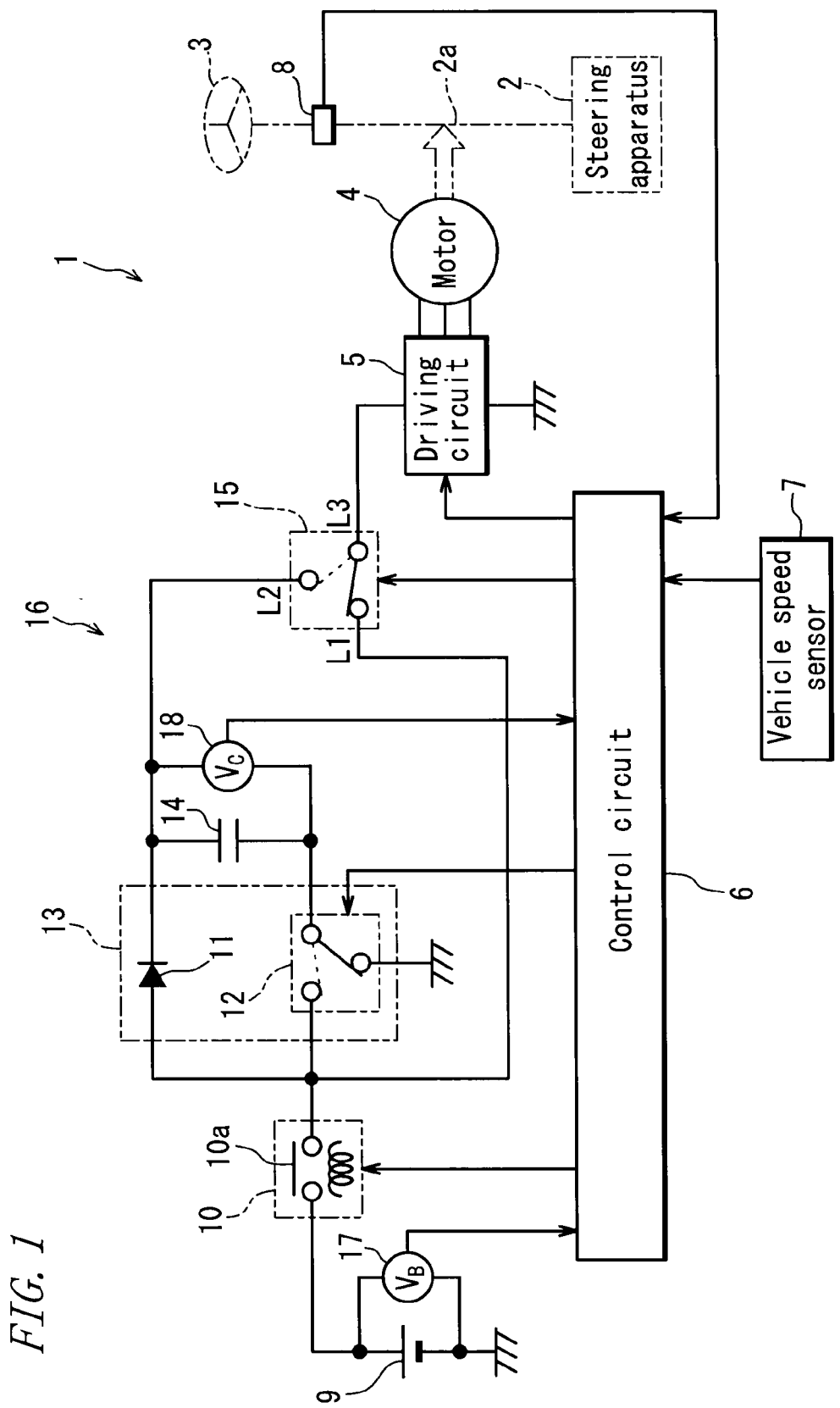
FIG. 1 is a schematic diagram principally showing an electric circuit of an electric power steering apparatus of a type that an auxiliary power supply is charged by a voltage of a battery and that the auxiliary power supply, when used, is connected in series with the battery as a main power supply.

FIG. 1 is a schematic diagram principally showing an exemplary electric circuit of an electric power steering apparatus 1. Referring to the figure, a steering apparatus 2 is driven by a steering torque applied to a steering wheel 3 by a driver and a steering assist force transmitted from a motor 4 to a steering shaft 2a via reduction gears (not shown). The motor 4 is a triple-phase brushless motor which is driven by a driving circuit 5. A control circuit 6 includes a microcomputer. The control circuit determines a required steering assist force based on a vehicle speed signal inputted from a vehicle speed sensor 7 and a steering torque signal inputted from a torque sensor 8. The control circuit controls the driving circuit 5 so as to apply the determined steering assist force to the steering shaft 2a.

A circuit for supplying an electric power to the driving circuit 5 is configured by connecting a battery 9 as a main power supply, a relay 10, a charge circuit 13 including a diode 11 and a switch 12, an auxiliary power supply 14 and a switch 15 as shown in the figure. Of the circuit configured by these components, the circuit components, except for the battery 9, relay 10 and auxiliary power supply 14, constitute a charge-discharge circuit 16. The charge-discharge circuit 16 charges the auxiliary power supply 14 by using the battery 9. Furthermore, the charge-discharge circuit 16 is adapted to selectively configure either a first output mode in which only the battery 9 is used for supplying the electric power to the motor 4 or a second output mode in which the battery 9 and the auxiliary power supply 14 are used for supplying the electric power to the motor 4.

In practice, an unillustrated alternator (having rectifier and regulator functions) is connected in parallel with the battery 9, constituting the main power supply jointly with the battery 9. For the sake of simplicity, however, the description is made on the assumption that the main power supply is the battery 9.

The relay 10 and switches 12 and 15 are controlled by the control circuit 6. The auxiliary power supply 14 is an electrical double layer capacitor or lithium-ion battery.

The switches 12 and 15 practically employ semiconductor switching devices such as MOS-FETs or the like and are configured to operate equivalently to the contacts shown in the figure. The switches 12 and 15 are adapted to operate in mutual synchronization so that when one of the switches is in a contact connection mode indicated by the solid line in the figure, the other switch is also in a contact connection mode indicated by the solid line in the figure.

A voltage $V_B$ (terminal-to-terminal voltage) of the battery 9 is detected by a voltage detector 17 connected in parallel with the battery. A voltage $V_C$ (terminal-to-terminal voltage) of the auxiliary power supply 14 is detected by a voltage detector 18 connected in parallel therewith. Output signals from the individual voltage detectors 17 and 18, namely the signals indicative of the respective voltages of the battery 9 and the auxiliary power supply 14, are inputted to the control circuit 6.

The relay 10 is closed during the normal operation of the electric power steering apparatus 1. Only in the case of failure, the relay 10 is controlled to open for fail-safe purpose. When the switch 12 is in the contact connection mode indicated by the solid line in the figure, a circuit is formed from the positive side of the battery 9 to the ground side of the battery 9 via a contact 10a of the relay 10, the diode 11, the auxiliary power supply 14 and the switch 12 so that the auxiliary power supply is charged. When the switch 12 is in a contact connection mode indicated by the broken line in the figure, the auxiliary power supply is not charged.

When the switches 12 and 15 are in the contact connection mode indicated by the solid lines in the figure, a circuit is formed from the battery 9 to the driving circuit 5 via the contact 10a and the switch 15 (electrically conducting path from L1 to L3). Thus an electric power is supplied to the driving circuit 5 and the motor 4 based on the voltage $V_B$ of the battery 9 (a first output mode). At this time, an electrically conducting path extending from the auxiliary power supply 14 to the driving circuit 5 is cut off by the switch 15. On the other hand, when the switches 12 and 15 are in the contact connection mode indicated by the broken lines in the figure, a circuit is formed from the battery 9 to the driving circuit 5 via the contact 10a, the switch 12, the auxiliary power supply 14 and the switch 15 (electrically conducting path from L2 to L3). Thus an electric power is supplied to the driving circuit 5 and the motor 4 based on a combined voltage $V_B+V_C$ of the battery 9 and auxiliary power supply 14 connected in series (a second output mode).

Figure 2:
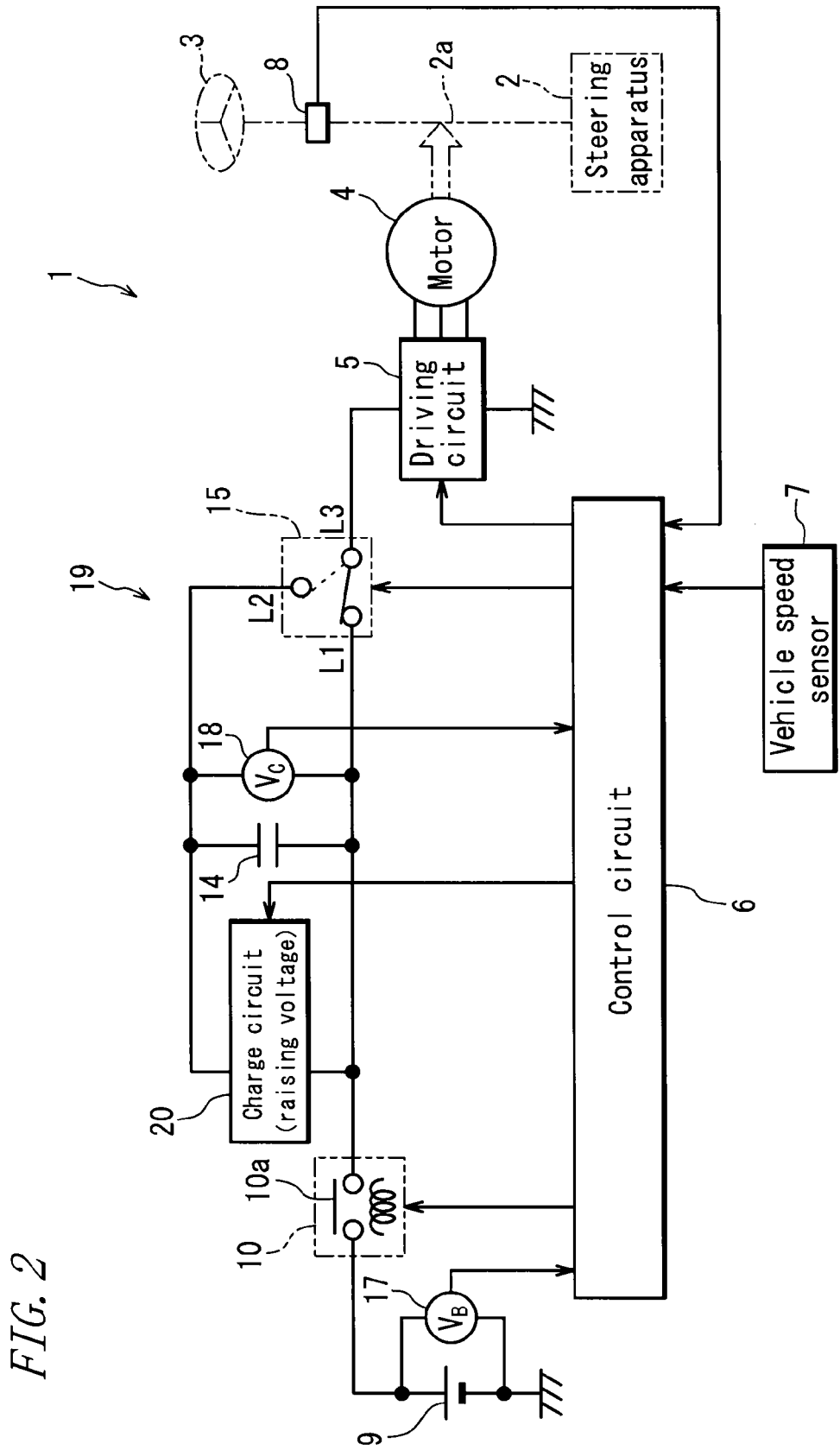
FIG. 2 is a schematic diagram principally showing an electric circuit of an electric power steering apparatus of a type that the battery is increased in voltage to charge the auxiliary power supply and that the auxiliary power supply, when used, is connected in series with the battery as the main power supply.

FIG. 2 is a schematic diagram principally showing an electric circuit of an electric power steering apparatus 1 of a different type from that shown in FIG. 1. A difference is a charge-discharge circuit 19 from the arrangement of the charge-discharge circuit 16 in FIG. 1 and the other parts are arranged in the same way. In this type of arrangement, a charge circuit 20 has a function to raise the voltage of the battery 9 to charge the auxiliary power supply 14. The charge circuit 20 is responsible for charging the auxiliary power supply 14 under the control of the control circuit 6. The voltage of the battery 9 is also applied to an electrically conducting path L1 extending from the battery 9 to the switch 15 via the contact 10a of the relay 10 while the auxiliary power supply 14 is connected to the electrically conducting path L1 at the lower potential side thereof.

When the switch 15 is in the contact connection mode indicated by the solid line in the figure, a circuit is formed from the battery 9 to the driving circuit 5 via the contact 10a and the switch 15 (the electrically conducting path from L1 to that L3). Thus the electric power is supplied to the driving circuit 5 and the motor 4 based on the voltage $V_B$ of the battery 9 (the first output mode). At this time, the electrically conducting path extending from the auxiliary power supply 14 to the driving circuit 5 is cut off by the switch 15. On the other hand, when the switch 15 is in the contact connection mode indicated by the broken line in the figure, a circuit is formed from the battery 9 to the driving circuit 5 via the contact 10a, the auxiliary power supply 14 and the switch 15 (the electrically conducting path from L2 to L3). Thus the electric power is supplied to the driving circuit 5 and the motor 4 based on the combined voltage $V_B+V_C$ of the battery 9 and the auxiliary power supply 14 connected in series (the second output mode).

Figure 3:
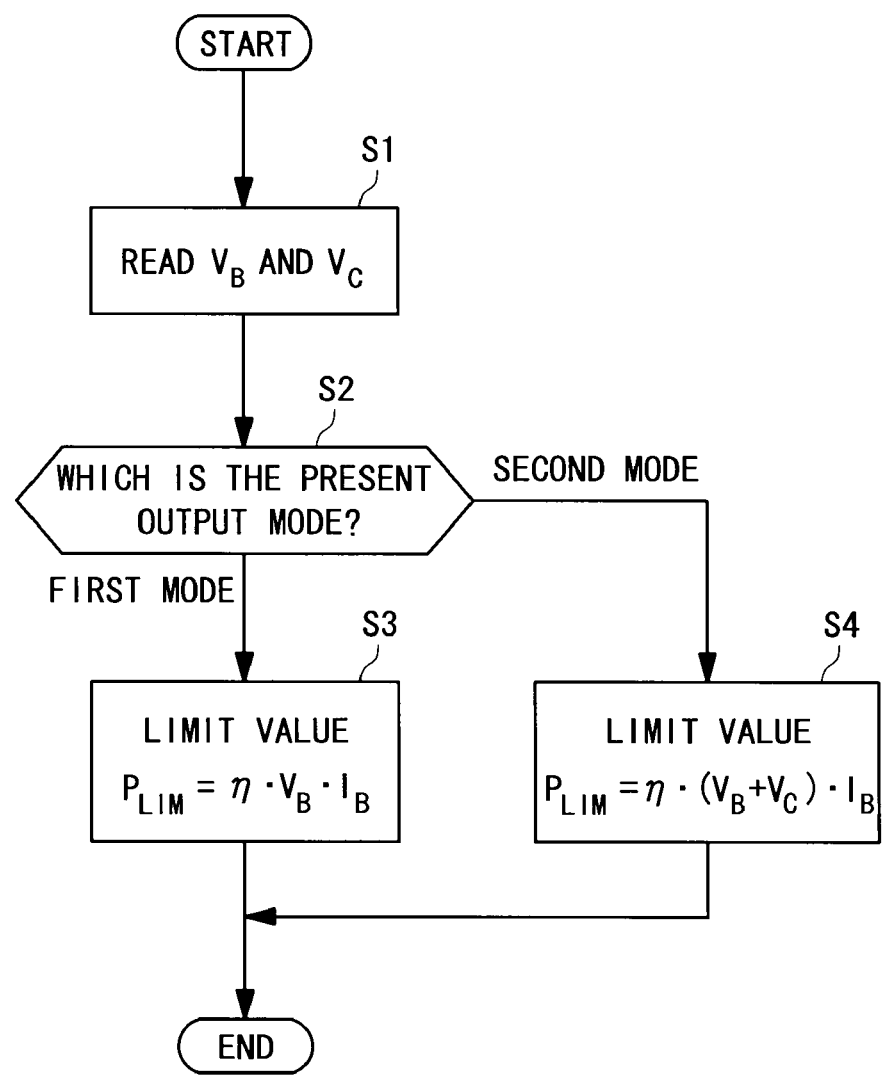
FIG. 3 is a flow chart showing the steps of a part of the processing made by a control circuit.

Next, an operation of the control circuit 6 for limiting the electric power is described with reference to a flow chart of FIG. 3. The operation of the control circuit is common to the circuit configurations of the above-described types (FIG. 1 and FIG. 2). FIG. 3 is a flow chart showing the steps of a part of the processing made by the control circuit 6. This processing is quickly repeated in parallel with the normal assist control. Further, this processing is started at the start-up of the electric power steering apparatus 1.

For the assist control, the control circuit 6 first estimates an electric power required for the generation of a required steering assist force based on the steering torque signal sent from the torque sensor 8 (FIG. 1 and FIG. 2) and the vehicle speed signal sent from the vehicle speed sensor 7 (FIG. 1 and FIG. 2). Then, the control circuit gives the charge-discharge circuit 16 (FIG. 1), 19 (FIG. 2) a command to select either the first output mode or the second output mode, and also controls the driving circuit 5 to drive the motor 4.

Referring to FIG. 3, the control circuit 6 reads the voltage $V_B$ of the battery 9 and the voltage $V_C$ of the auxiliary power supply 14 based on the output signals from the voltage detectors 17 and 18 (Step S1). The control circuit 6 performs a different processing depending upon whether the present output mode is the first output mode or the second output mode (Step S2). If the first output mode is selected, for example, a processing of Step S3 is performed. In Step S3, the control circuit 6 defines a limit value $P_{LIM}$ of the upper limit of electric power as $$P_{LIM}=\eta \cdot V_B \cdot I_B \tag{1}$$

In the above equation, $\eta$ represents the efficiency of the driving circuit 5 and $I_B$ represents the upper limit value (fixed value) of the current which is thought to be extractable from the battery 9 upon consideration of the prevention of decrease in battery life and of the blowout of a fuse for circuit protection. Therefore, the limit value $P_{LIM}$ means the maximum electric power available from the battery 9 at the present voltage $V_B$ of the battery 9.

If the electric power required for assist control is equal to or lower than the limit value $P_{LIM}$ of the equation (1), the electric power of the present value is supplied to the motor 4. In a case where the required electric power exceeds the limit value $P_{LIM}$, an electric power of the limit value $P_{LIM}$ is supplied to the motor 4. Therefore, the value of the current extracted from the battery 9 does not exceed the upper limit value $I_B$.

On the other hand, if it is determined in Step S2 in FIG. 3 that the second output mode is selected, a processing of Step S4 is performed. In Step S4, the control circuit 6 defines the limit value $P_{LIM}$ of the upper limit of electric power as $$P_{LIM}=\eta \cdot (V_B+V_C) \cdot I_B \quad (2)$$

Therefore, the limit value $P_{LIM}$ in this case means the maximum electric power available from the serially-connected power supplies including the battery 9 and the auxiliary power supply 14 at the present voltage $V_B$ of the battery 9 and the present voltage $V_C$ of the auxiliary power supply 14.

If the electric power required for the assist control is equal to or lower than the limit value $P_{LIM}$ of the equation (2), the electric power of the present value is supplied to the motor 4. In a case where the required electric power exceeds the limit value $P_{LIM}$, an electric power of the limit value $P_{LIM}$ is supplied to the motor 4. Therefore, the value of the current extracted from the battery 9 does not exceed the upper limit value $I_B$.

In the electric power steering apparatus 1 according to the embodiment as described above, the upper limit (variable) of the electric power according to the output mode is defined based on the upper limit value $I_B$ (fixed) previously defined as the maximum value of the current through the battery 9, the present voltage $V_B$ (variable) of the battery 9 and the present voltage $V_C$ (variable) of the auxiliary power supply 14. If the voltage $V_B$ of the battery 9 and the voltage $V_C$ of the auxiliary power supply 14 are varied, the upper limit value of the electric power is varied accordingly. Therefore, the maximum value of the current through the battery 9 is always limited to the upper limit value $I_B$ or lower. Thus the excess current is prevented from being extracted from the battery 9 as the main power supply.

While the control circuit 6 according to the above-described embodiment estimates the electric power required for generating the required steering assist force and selects the output mode based on the estimated electric power, the output mode can be selected in other ways. For instance, the current supplied to the driving circuit 5 is varied according to the required steering assist force under the assist control provided by the control circuit 6. Hence, a procedure may be taken which includes the steps of: actually detecting the voltage of the battery 9 and the current supplied to the driving circuit 5, determining the present value of electric power by multiplying these detected values, and selecting the output mode based on the present value thus determined.

The invention claimed is:

1. An electric power steering apparatus that generates a steering assist force by a motor, comprising:
   a driving circuit that drives the motor and having an efficiency $\eta$;
   a battery as a main power supply that supplies an electric power to the motor;
   an auxiliary power supply that supplies an electric power to the motor;
   a voltage detector that detects a voltage $V_B$ of the main power supply;
   a voltage detector that detects a voltage $V_C$ of the auxiliary power supply;
   a charge-discharge circuit that charges the auxiliary power supply by using the main power supply and that selectively configures a first output mode in which an electric power is supplied to the motor based on the voltage $V_B$ of the main power supply or a second output mode in which an electric power from the main power supply and the auxiliary power supply connected in series is supplied to the motor based on a voltage $V_B+V_C$; and
   a control circuit that supplies the electric power to the motor and selects the output mode of the charge-discharge circuit according to an electric power required for steering assist and that, on the basis of an upper limit value $I_B$ previously defined as a maximum value of current through the main power supply, defines an upper limit of the electric power supplied to the motor as $\eta \cdot V_B \cdot I_B$ when the first output mode is selected or as $\eta \cdot (V_B+V_C) \cdot I_B$ when the second output mode is selected.

* * * * *